(12) United States Patent
Schiewe et al.

(10) Patent No.: US 8,311,366 B2
(45) Date of Patent: Nov. 13, 2012

(54) SYSTEM AND METHOD FOR CALIBRATING AND ADJUSTING A PROJECTED IMAGE OF A PROJECTION APPARATUS

(75) Inventors: Manuel Schiewe, Berlin (DE); Stefan Klose, Schönefeld (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 1012 days.

(21) Appl. No.: 12/160,289

(22) PCT Filed: Jan. 12, 2007

(86) PCT No.: PCT/EP2007/000258
§ 371 (c)(1),
(2), (4) Date: Nov. 5, 2008

(87) PCT Pub. No.: WO2007/082690
PCT Pub. Date: Jul. 26, 2007

(65) Prior Publication Data
US 2009/0067749 A1    Mar. 12, 2009

(30) Foreign Application Priority Data
Jan. 13, 2006   (DE) .......................... 10 2006 002 602

(51) Int. Cl.
*G06K 9/32* (2006.01)
*G03B 21/26* (2006.01)
*H04N 5/66* (2006.01)

(52) U.S. Cl. ........................... 382/294; 353/94; 348/383

(58) Field of Classification Search .................. 382/294
See application file for complete search history.

(56) References Cited

U.S. PATENT DOCUMENTS

| | | | |
|---|---|---|---|
| 3,715,888 A | 2/1973 | Massie | |
| 4,639,224 A | 1/1987 | Maejima et al. | |
| 4,680,579 A | 7/1987 | Ott | |
| 5,196,900 A | 3/1993 | Pettersen | |

(Continued)

FOREIGN PATENT DOCUMENTS

DE    102 15893    10/2003

(Continued)

OTHER PUBLICATIONS

Forster, et al. "The Hiscore Camera—A Real Time Three Dimensional and Color Camera", Proceedings 2001 International Conferences Image Processing, pp. 598-601, vol. 2.

(Continued)

*Primary Examiner* — David Zarka
(74) *Attorney, Agent, or Firm* — The Webb Law Firm

(57) ABSTRACT

The invention relates to a calibration method and system for at least one projection apparatus, where the geometric data from at least one projection area has been or are stored in advance in a computer unit, wherein a) the at least one projection apparatus projects previously known calibration patterns onto at least one portion of the projection area, with the calibration patterns having at least one overlap region among one another, b) the calibration patterns are recorded by at least one camera apparatus as a calibration image, where c) the computer unit is used to automatically ascertain the difference between the recorded real calibration image and an ideal depiction result from the previously known calibration pattern on the projection area as a reference pattern, and where subsequently the difference between the real calibration image and the reference pattern is used to ascertain a correction transform.

14 Claims, 14 Drawing Sheets

U.S. PATENT DOCUMENTS

| | | |
|---|---|---|
| 5,245,451 A | 9/1993 | Wu et al. |
| 5,988,817 A | 11/1999 | Mizushima et al. |
| 6,020,931 A | 2/2000 | Bilbrey et al. |
| 6,056,405 A | 5/2000 | Heintz et al. |
| 6,115,022 A | 9/2000 | Mayer, III et al. |
| 6,140,980 A | 10/2000 | Spitzer et al. |
| 6,219,099 B1 | 4/2001 | Johnson et al. |
| 6,310,650 B1 | 10/2001 | Johnson et al. |
| 6,362,797 B1 | 3/2002 | Dehmlow |
| 6,377,306 B1 | 4/2002 | Johnson et al. |
| 6,411,302 B1 | 6/2002 | Chiraz |
| 6,480,175 B1 * | 11/2002 | Schneider ............... 345/32 |
| 6,483,537 B1 | 11/2002 | Mayer, III et al. |
| 6,498,592 B1 | 12/2002 | Matthies |
| 6,564,119 B1 | 5/2003 | Vaculik et al. |
| 6,570,623 B1 | 5/2003 | Li et al. |
| 6,636,205 B1 | 10/2003 | Lasneski |
| 6,695,451 B1 | 2/2004 | Yamasaki et al. |
| 6,709,116 B1 | 3/2004 | Raskar et al. |
| 6,715,888 B1 | 4/2004 | Raskar et al. |
| 6,727,864 B1 | 4/2004 | Johnson et al. |
| 6,729,733 B1 | 5/2004 | Raskar et al. |
| 6,733,138 B2 | 5/2004 | Raskar |
| 6,755,537 B1 | 6/2004 | Raskar et al. |
| 6,760,075 B2 | 7/2004 | Mayer, III et al. |
| 6,793,350 B1 | 9/2004 | Raskar et al. |
| 6,804,406 B1 | 10/2004 | Chen |
| 6,911,969 B1 | 6/2005 | Nelson et al. |
| 6,924,832 B1 | 8/2005 | Shiffer et al. |
| 2001/0031143 A1 | 10/2001 | Kamon et al. |
| 2001/0048801 A1 | 12/2001 | Saccomanno |
| 2002/0024640 A1 * | 2/2002 | Ioka ............... 353/94 |
| 2002/0067439 A1 | 6/2002 | Mayer, III et al. |
| 2002/0122044 A1 | 9/2002 | Deering |
| 2002/0158877 A1 | 10/2002 | Guckenberger et al. |
| 2002/0167458 A1 | 11/2002 | Baudisch et al. |
| 2002/0167589 A1 | 11/2002 | Schofield et al. |
| 2003/0034974 A1 | 2/2003 | Welch et al. |
| 2003/0034976 A1 | 2/2003 | Raskar et al. |
| 2003/0038822 A1 | 2/2003 | Raskar |
| 2003/0043152 A1 | 3/2003 | Raskar |
| 2003/0052837 A1 | 3/2003 | Raskar |
| 2003/0052890 A1 | 3/2003 | Raskar |
| 2003/0067587 A1 | 4/2003 | Yamasaki et al. |
| 2003/0098819 A1 | 5/2003 | Sukthankar et al. |
| 2003/0142883 A1 * | 7/2003 | Ishii ............... 382/284 |
| 2003/0156262 A1 | 8/2003 | Baker et al. |
| 2003/0174163 A1 | 9/2003 | Gnanamgari et al. |
| 2004/0005256 A1 | 1/2004 | Wei et al. |
| 2004/0085256 A1 | 5/2004 | Hereid et al. |
| 2004/0085477 A1 | 5/2004 | Majumder |
| 2004/0085519 A1 | 5/2004 | Dubin et al. |
| 2004/0150795 A1 | 8/2004 | Ishii et al. |
| 2004/0155965 A1 | 8/2004 | Jaynes et al. |
| 2004/0184010 A1 | 9/2004 | Raskar et al. |
| 2004/0184011 A1 | 9/2004 | Raskar et al. |
| 2004/0184013 A1 | 9/2004 | Raskar et al. |
| 2004/0239653 A1 | 12/2004 | Stuerzlinger |
| 2004/0239884 A1 | 12/2004 | Nagashima et al. |
| 2004/0239885 A1 | 12/2004 | Jaynes et al. |
| 2004/0257540 A1 | 12/2004 | Roy et al. |
| 2005/0083402 A1 | 4/2005 | Klose |
| 2005/0103976 A1 | 5/2005 | Loka et al. |
| 2005/0110959 A1 | 5/2005 | Miyazawa et al. |
| 2005/0117121 A1 | 6/2005 | Meerleer |
| 2005/0117126 A1 | 6/2005 | Miyazawa et al. |
| 2005/0146644 A1 | 7/2005 | Miyazawa et al. |
| 2005/0162511 A1 | 7/2005 | Jackson |
| 2005/0206856 A1 * | 9/2005 | Ishii ............... 353/94 |
| 2005/0206857 A1 * | 9/2005 | Yamada ............... 353/94 |
| 2005/0231691 A1 | 10/2005 | Li |
| 2006/0001839 A1 | 1/2006 | Beardsley et al. |

FOREIGN PATENT DOCUMENTS

| | | |
|---|---|---|
| DE | 10251217 | 6/2004 |
| DE | 102004045280 | 4/2006 |
| EP | 0 862 082 | 8/2003 |
| EP | 1 116 386 | 5/2004 |
| EP | 1 424 672 | 6/2004 |
| EP | 1434434 | 6/2004 |
| JP | 2004208022 | 12/2002 |
| JP | 2003315914 | 6/2003 |
| WO | WO 90/13847 | 11/1990 |
| WO | WO 99/57628 | 11/1999 |
| WO | WO 00/60413 | 10/2000 |
| WO | WO 01/47259 | 6/2001 |
| WO | WO 02/100094 | 12/2002 |
| WO | WO 03/051059 | 6/2003 |
| WO | WO 2004/062293 | 7/2004 |
| WO | WO 2004/084547 | 9/2004 |
| WO | WO 2004/084548 | 9/2004 |
| WO | WO 2005/067288 | 7/2005 |

OTHER PUBLICATIONS

D. Caspi et al., Rangae Imaging with Adaptive Color Structured Light, IEEE PAMI 20(5), 1998.

K.L. Boyer et al., Color-Encoded Structured Light for Rapid Active Ranging, IEEE PAMI 9(1), pp. 14-28, 1987.

* cited by examiner

SYSTEM AND METHOD FOR CALIBRATING AND ADJUSTING A PROJECTED IMAGE OF A PROJECTION APPARATUS

BACKGROUND OF THE INVENTION

In many fields, use is currently being made of projection apparatuses in order to irradiate relatively large and complex projection areas with images, films or the like. Since the projection areas are generally not planar, and the overall images are composed of partial images, the problem arises that distortions occur in the transition region of two partial images. Again, it is impossible in the case of dome-shaped projection areas, for example, to undertake a projection with the aid of only one projector. In the case of a number of projectors, the problem of overlapping then occurs repeatedly.

It is an object of the present invention to provide a calibration method and a calibration system that can be used to irradiate large and/or complex projection areas with the aid of a projection apparatus with as few distortions as possible.

SUMMARY OF THE INVENTION

At least one projection apparatus in this case projects previously known calibration patterns onto at least a portion of a projection area, the calibration patterns having at least one overlap region with one another. The calibration patterns are recorded by at least one camera apparatus as a calibration image, and the data of the calibration image are transmitted to a computer unit, the deviation between the recorded real calibration image and an ideal imaging result of the previously known calibration pattern on the projection area being automatically determined as reference pattern by means of the computer unit. The ideal imaging result determined with the aid of the previously known data therefore serves as a reference for the actual projection that has been recorded by the camera apparatus.

Subsequently, a correction transform is determined from the deviation between a real calibration image and the reference pattern so that the link between the correction transform and a real projection of images by the at least one projection apparatus corresponds, particularly in an overlap region, to the reference pattern apart from a small, in particular minimum, deviation. It is possible in this case, for example, to prescribe for the deviation a specific threshold value that still provides an acceptable distortion for a viewer.

It is advantageous when the correction transform exhibits a displacement of at least one point, in particular an interpolation point of the really recorded calibration image onto a point of the reference pattern. In this first embodiment, a really determined point, for example the intersection point in a calibration pattern, is displaced onto the computationally determined reference location. In the case of a number of points, the transforms (for example displacements) can also prove to be different for each point.

It is also advantageous when the correction transform defines a displacement of a point in such a way that the spacing between two points of the calibration pattern is averaged in order to determine a target point. Such a correction transform is easy to carry out. However, it is particularly advantageous here when a weighting is performed, particularly as a function of the location of the point in the projected image, in order to average the spacing. Thus, a projected point that is arranged nearer the middle of the projector image can be given a higher weighting than a point that lies at the edge of the projected image.

In a further advantageous embodiment, at least one marker is arranged in and/or on the projection area for acquisition by the camera apparatus. The at least one marker is advantageously designed as a laser or LED.

An advantageous refinement of the inventive method has a projection area that has at least partially a spherical shell, a cylindrical shell and/or a planar surface. Such areas are suitable for projections in a particular way.

It is also advantageous when the camera apparatus has at least one digital camera, at least one video camera, at least one fish-eye camera and/or at least one webcam. These cameras are suited individually and/or jointly for recording a calibration pattern quickly and directing the corresponding data to the computer unit for further processing.

Precisely in the case of relatively large projection areas, or even 360° areas, it is advantageous when at least one camera apparatus is mounted rotatably on at least one axis in order to record an image of the projection area. It is therefore possible for an appropriately projected calibration pattern to be recorded efficiently.

It is advantageous when at least one projection apparatus has at least a beamer, laser projector, LCD projector and/or DLP projector.

The at least one calibration pattern is advantageously a strip pattern in which individual strips are arranged parallel to one another.

Again, the strips can advantageously be of curved (predistorted), single-color, multicolor or color-coded design. A further advantageous embodiment uses point patterns, it also being possible to use a number of different types of pattern (for example point and strip patterns) in a calibration pattern.

In order to suppress disturbing light influences, it is advantageous when the camera apparatus records a black and white image before the evaluation of a recording of at least one calibration pattern. A black and white image is a photograph of a black projection by the projector apparatus. This black and white image includes inter alia instances of glare that can then be removed by calculation during subsequent processing.

In a further advantageous refinement of the inventive calibration method, blending is undertaken in the overlap region in order to adapt the brightness values.

The correction transform determines the requisite variations in the projections. Additionally, or else alternatively, the projection can be varied not only computationally, but it is also possible that at least one spatial orientation of at least one projection apparatus is automatically varied as a function of the correction transform.

Furthermore, parameters of the camera apparatus can advantageously be automatically determined by making a recording of a previously known pattern, in particular of a marker pattern on the projection area such that the computer unit can calculate the parameters therefrom.

At least one projection apparatus serves for projecting previously known calibration patterns onto at least a portion of the projection area. The calibration patterns can, but need not overlap one another.

At least one camera apparatus serves to record the calibration patterns as a calibration image, it being possible to transmit the data of the calibration image to the computer unit and the computer unit being used for automatically determining the deviation between the recorded real calibration image and an ideal imaging result (reference pattern) of the previously known calibration pattern on the projection area.

A correction means serves to determine a correction transform from the deviation between real calibration image and the reference pattern so that the link between the correction transform and a real projection of images by the at least one projection apparatus corresponds, particularly in an overlap region, with the reference pattern apart from a small, in particular minimum, deviation.

BRIEF DESCRIPTION OF THE DRAWINGS

The invention is explained in more detail below with reference to the figures of the drawings and a number of exemplary embodiments. In the drawings.

DETAILED DESCRIPTION OF THE INVENTION

Figure 1:
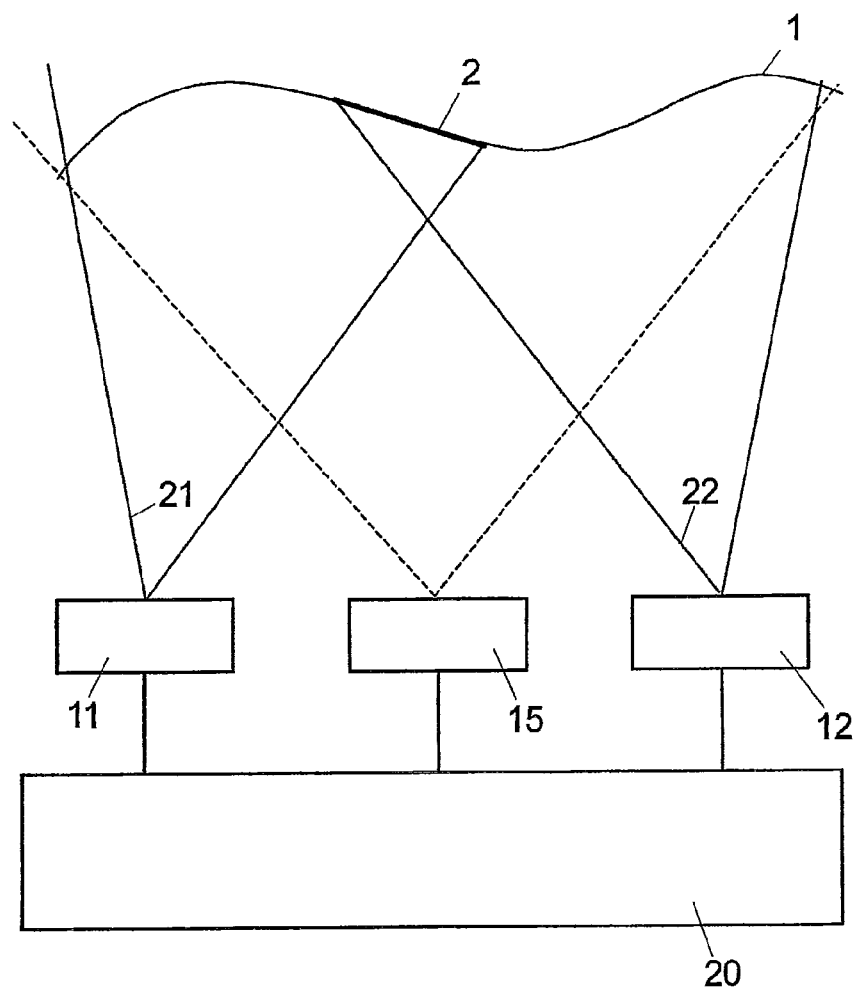
FIG. 1 shows a schematic of an embodiment of the inventive calibration system having two projection apparatuses.

For the sake of simplicity, FIG. 1 describes an embodiment of the inventive calibration system and of the inventive calibration method in the case of which two projection apparatuses 11, 12 are used for projecting images onto a projection area 1. However, it is also possible in principle to use more than two projection apparatuses 11, 12.

Projections with the aid of a number of projection apparatuses 11, 12 are used wherever images are to be projected onto complex and/or large projection areas 1.

Here, images are understood as stills (for example panoramic views, slides etc.), moving images (for example video images) or else 3D images. The term images also comprises combinations of these image types.

FIG. 1 illustrates a basic situation for such a system, the projection area 1 for the images being shaped here in complex fashion from differently curved segments. It is possible in principle to select geometries such as, for example, a plane, spherical shells, parts of spherical shells, cylinders, cylindrical shells or other concave and/or convex geometries for the projection area 1. It is also possible furthermore for the projection area 1 not to consist of one piece, so that the projection apparatuses 11, 12 project images onto a number of projection areas 1 distributed in space.

It is possible in principle to make use for a projection area 1 of any geometry whose data can be described by parameters, tables and/or functional relationships. These geometric data of the projection area 1 must be known in advance, since these data are used within the scope of the invention to determine a theoretically ideal imaging performance (that is to say a reference pattern) that serves as reference for real imaging.

Images can be projected onto the projection area 1, these images being composed of partial images 21, 22 of the projection apparatuses 11, 12. The partial images 21, 22 overlap one another in an overlap region 2 in order to yield an overall image in sum. In the case of more than two partial images 21, 22, a number of overlap regions 2 also result.

The partial images 21, 22 must lie on one another as perfectly as possible in the overlap region 2 so that no "seams" are visible between the partial images 21, 22 and the best possible overall image results.

Figure 5:
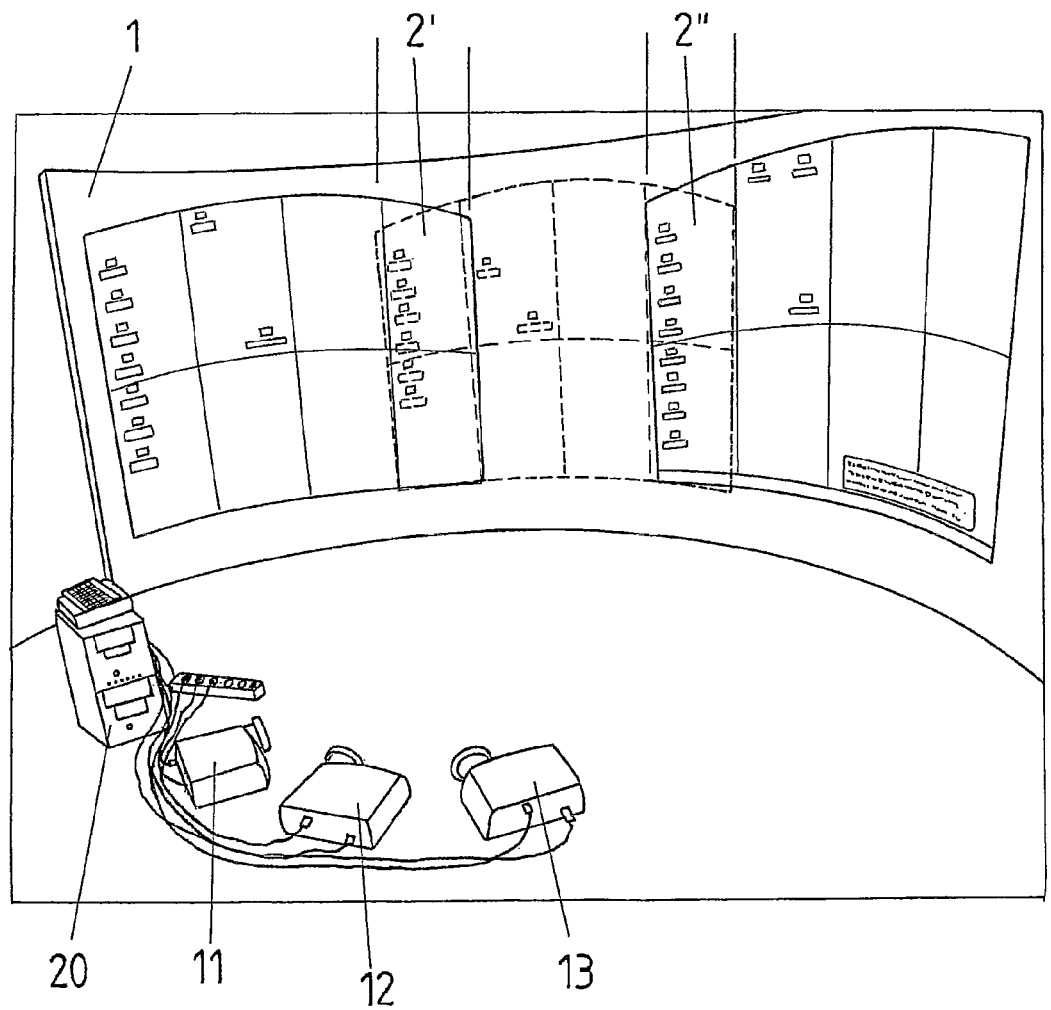
FIG. 5 shows a recording of a configuration having three projection apparatuses.

A real configuration is illustrated in the illustration of FIG. 5. Use is made here of three projection apparatuses 11, 12, 13 that cast images onto a projection area 1 in the shape of a cylindrical shell. In the case of the geometric conditions present here, two overlap regions 2', 2" are present between the projected images. The projection apparatuses 11, 12, 13 are coupled to a computing unit 20. The camera apparatus 15 is not visible itself, since the picture of FIG. 5 is shown from the perspective of the camera apparatus 15.

Figure 6:
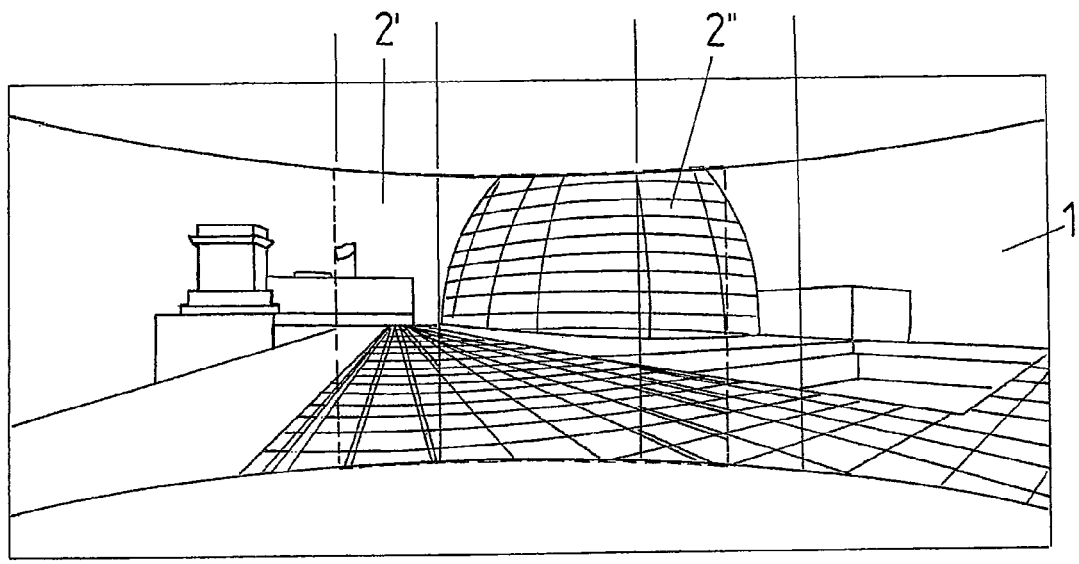
FIG. 6 shows a recording of a projection composed of three partial images before the execution of the calibration method.

FIG. 6 illustrates the uncalibrated case, in which, by analogy with FIG. 5, the three partial images have not yet been adapted in the overlap regions 2', 2". This is to be seen, for example, from the double lines on the floor of the illustration in FIG. 6.

By using at least one camera apparatuses 15 and with the aid of special calibration patterns 30 (see also FIGS. 3 and 4), the calibration method and calibration system described here detect the deviations (for example errors in alignment) of the partial images 21, 22 in the overlap region 2, and correct the projector images for a later projection to the effect that the partial images 21, 22 lie upon one another as perfectly as possible in the overlap region 2, such that a seamless overall image is ensured (automatic fine calibration/autocalibration).

The at least one camera apparatus 15 can have at least one digital photographic camera, at least one video camera, at least one camera with fish-eye lens and/or a webcam, it also being possible to use combinations of these elements.

Any types of projection apparatuses 11, 12 can be used. When the projector properties are known, both the external ones (position, orientation) and the internal ones (aperture angle, aspect ratio), these can be taken into account computationally during geometric rectification.

When the geometric data of the projection area 1 and, if appropriate, of the projection apparatuses 11, 12 are known, the requisite geometric rectification can be calculated, that is to say the projector images are at least transformed such that a correct overall image composed of the partial images 21, 22 results on the projection area 1.

The seams in the overlap region 2 are rendered as invisible as possible by soft edge blending, that is to say throughout the course of the overlap regions 2, one projection apparatus 11 respectively becomes darker (fade-out), while the next projection apparatus 12 becomes brighter (fade-in) to the same extent, so that the same brightness is achieved in sum of the projection apparatuses 11, 12 at each pixel of the overlap regions 2 as in the regions that are irradiated only by a single projection apparatus 11, 12.

The regions in which the aim is to perform blending can be input by the user (on a sphere with latitude and longitude lines, for example as "blending between projector 1 and projector 2 from longitude line 5 to 10"), or the entire overlap region 2 of each two projection apparatuses 11, 12 is automatically determined and used as blending region.

In the former case (input by user), the user can also specify complicated blending processes via interpolation point definitions through which, for example, splines are then laid.

Figure 2:
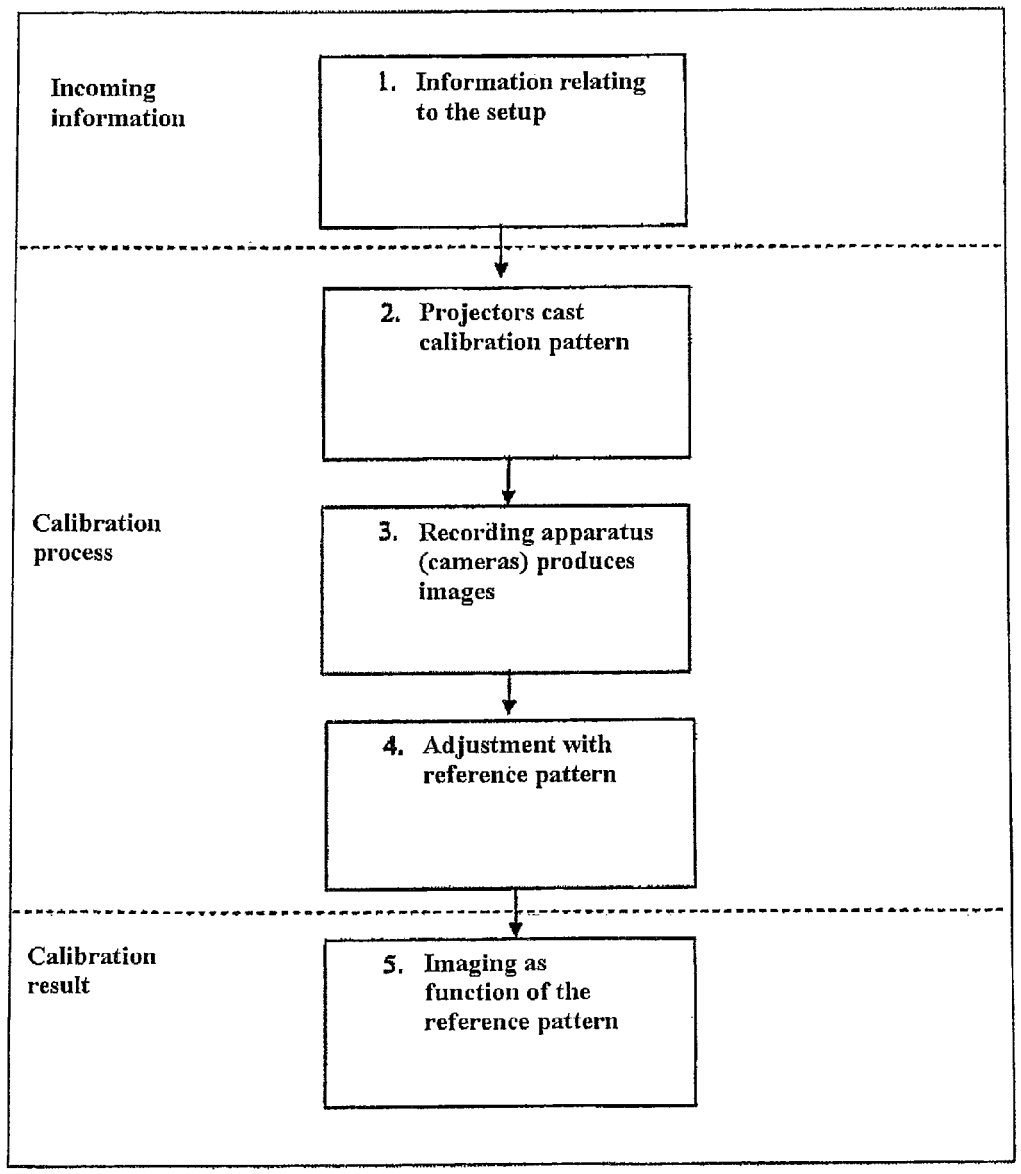
FIG. 2 shows a schematic of an embodiment of the inventive calibration method.

The function of a camera apparatus 15 in cooperation with a computing unit 20 is described in conjunction with the description of FIG. 2.

FIG. 2 is a schematic of an embodiment of the inventive calibration method in which it is intended to produce as seamless as possible overlap between partial images 21, 22 described in conjunction with FIG. 1.

During automatic fine calibration, the projection apparatuses 11, 12 cast as calibration pattern 30 onto the projection area 1 previously known strip images determined sequentially and/or simultaneously and which are recorded by at least one camera apparatus 15 (see FIG. 1). When, for example, the projection apparatuses 11, 12 project the calibration patterns 30 sequentially, one image is recorded in relation to each calibration pattern 30, in which case these images are, for example, combined in the computer unit 20 to form a virtual overall image. The image thus recorded is denoted as a calibration image.

The calibration image shows the real distortions of the calibration pattern 30 in the overlap region 2. The data of the calibration image are transmitted to the computer unit 20. The computer unit 20 can have, for example, a processor, a PC, a cluster of PCs or a workstation. The computer unit 20 can, for example, be arranged in one of the other apparatuses (projection apparatus, camera apparatus, projection area) and/or the computer unit 20 is designed as a separate system.

The computer unit 20 automatically determines the deviation between the recorded real calibration image and an ideal imaging result of the previously known calibration pattern 30 on the projection area 1. Since both the calibration pattern 30 and the geometry of the projection area 1 are known, it can be calculated how the image must appear in the ideal case in the overlap region 2. This ideal case is used as reference pattern to which the real imaging result (that is to say the calibration image) is to be approximated.

The computer unit 20 automatically determines a correction transform 50 from the deviation between the real calibration image and the ideal imaging result such that the link between the correction transform 50 and a real projection of images by the at least two projection apparatuses 11, 12 in the overlap region 2 corresponds to the ideal imaging result apart from a small, in particular minimum deviation.

Figure 7:
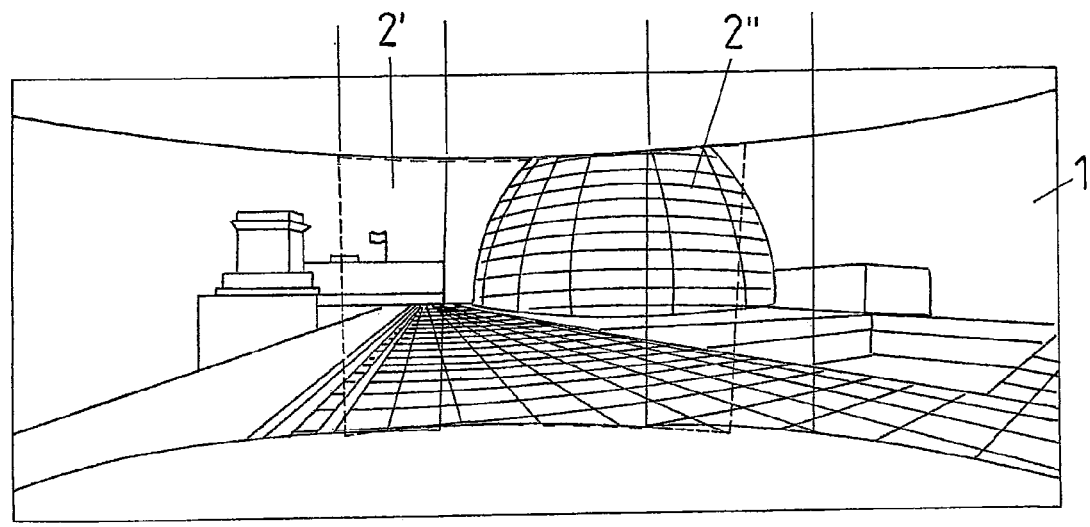
FIG. 7 shows a recording of a projection composed of three partial images after the execution of the calibration method.
Figure 8:
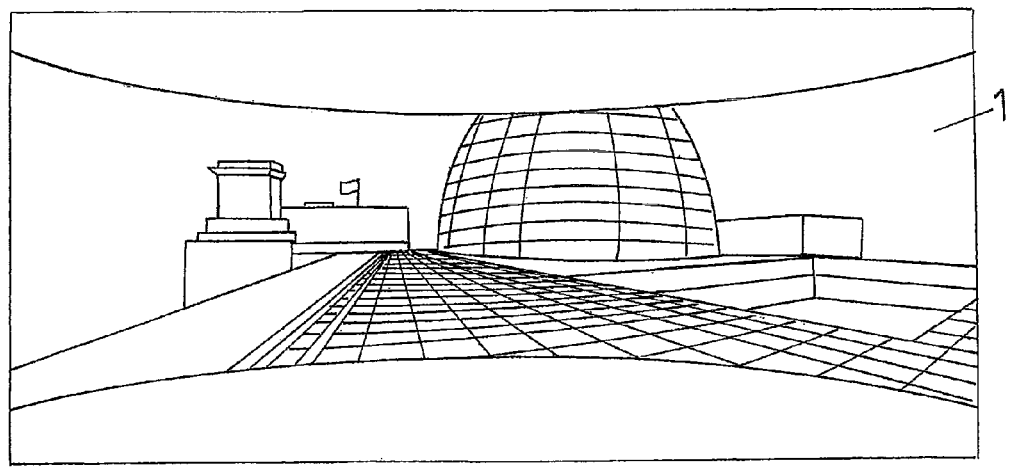
FIG. 8 shows a recording of the projection according to FIG. 7 with a brightness correction (blending) in the overlap region.

Starting from the projections in accordance with FIG. 6, the result of the calibration is illustrated in FIG. 7 with the aid of an embodiment of the method. Comparison shows that the lines on the floor in the overlap region 2', 2" in the illustration lie upon one another so that double lines are no longer visible. However, the overlap regions 2', 2" are clearly brighter than the remainder of the illustration. The above-described blending can be used to produce the result in accordance with FIG. 8, which is a uniformly illuminated overall image.

Three embodiments are described below in relation to this basic cycle.

In the first embodiment, the external parameters (for example the position) and internal parameters (for example the lens geometry) of the camera apparatus 15 must be known as accurately as possible. This is not required in the case of the second embodiment.

It is advantageous for both embodiments when the parameters of the configuration (geometry and projection apparatuses 11, 12) are known and have also been set up approximately as planned. The partial images 21, 22 already match up to some extent in this case. Only the errors that have not yet been compensated are to be removed by the automatic fine calibration.

In the third embodiment, neither are the parameters of the camera apparatus 15 known nor are the projection apparatuses 11, 12 preadjusted.

As mentioned, in the first embodiment there is an additional need to know the parameters of the camera apparatus 15, specifically as exactly as possible. This determination of the parameters, also termed camera calibration, can be carried out with the aid of an embodiment of the inventive calibration method.

In this case, markers are fastened on the projection area 1 at specific sites (for example colored paper circles, LED luminaires, etc.). The camera apparatus 1 to be calibrated records images on which the markers are to be detected. The computer unit 20 analyzes the images and detects the locations of the markers in the camera image. Since the 3D positions of the markers are known, it is now possible to calculate the camera parameters from this information (for example position and orientation of the camera).

In the first exemplary embodiment, the overall configuration (projection area 1, projection apparatuses 11, 12, camera apparatuses 15) is modeled in the computing unit 20 of the system.

The way in which calibration patterns 30 are used to correct the distortion is described below with the aid of different embodiments.

At least one projection apparatus in this case casts onto the projection area 1 defined calibration patterns 30 that are recorded by the camera apparatus 15 (calibration image in the camera image space). The system recognizes the patterns of the projector images in the photos and thereby has a set of interpolation points in the projector image space with unique assignment in the camera image space. The assignment is performed by means of a color coding of the strips that is known per se. Such a color coding is, for example, the article entitled "The Hiscore Camera—A real time three dimensional and color camera" by Forster et al. in Proceedings 2001 International Conferences Image Processing, pages 598-601 vol. 2. A calibration pattern 30 is illustrated in a simplified way in FIG. 3. In this case, a first projection apparatus 11 (not illustrated here) casts a first calibration pattern 31 (dashed lines) with horizontal strips 31*a* and vertical strips 31*b*. Here, only one strip 31*a*, 31*b* is respectively illustrated. A first intersection point 35 results.

A second projection apparatus 12 (likewise not illustrated here) casts a second calibration pattern 32 (dashed and dotted lines) with horizontal strips 32*a* and vertical strips 32*b*. Here, as well, only one strip 32*a*, 32*b* is respectively illustrated. A second intersection point 36 results.

Furthermore, there exists a reference pattern 40 (continuous lines) with horizontal strips 41*a* and vertical strips 41*b*. A third intersection point 42 results. The reference pattern 40 is defined in this first embodiment by the camera apparatus 15, since it is presupposed that the camera position is accurately known. The camera apparatus defines where the lines of the projection apparatuses 11, 12 are to lie on the projection area 1.

Figure 3:
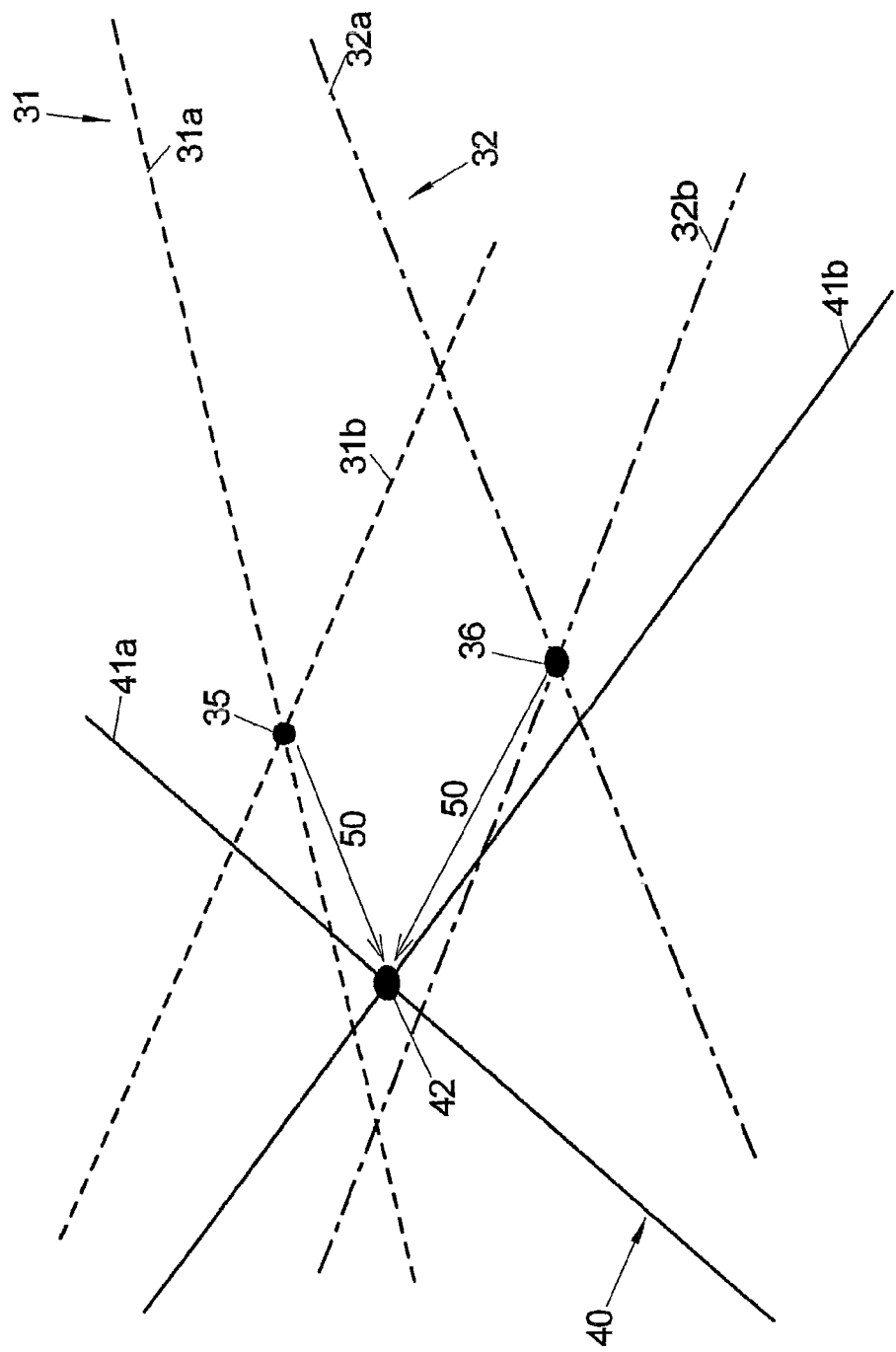
FIG. 3 shows a schematic of the determination of a correction transform in accordance with a first embodiment.
Figure 4:
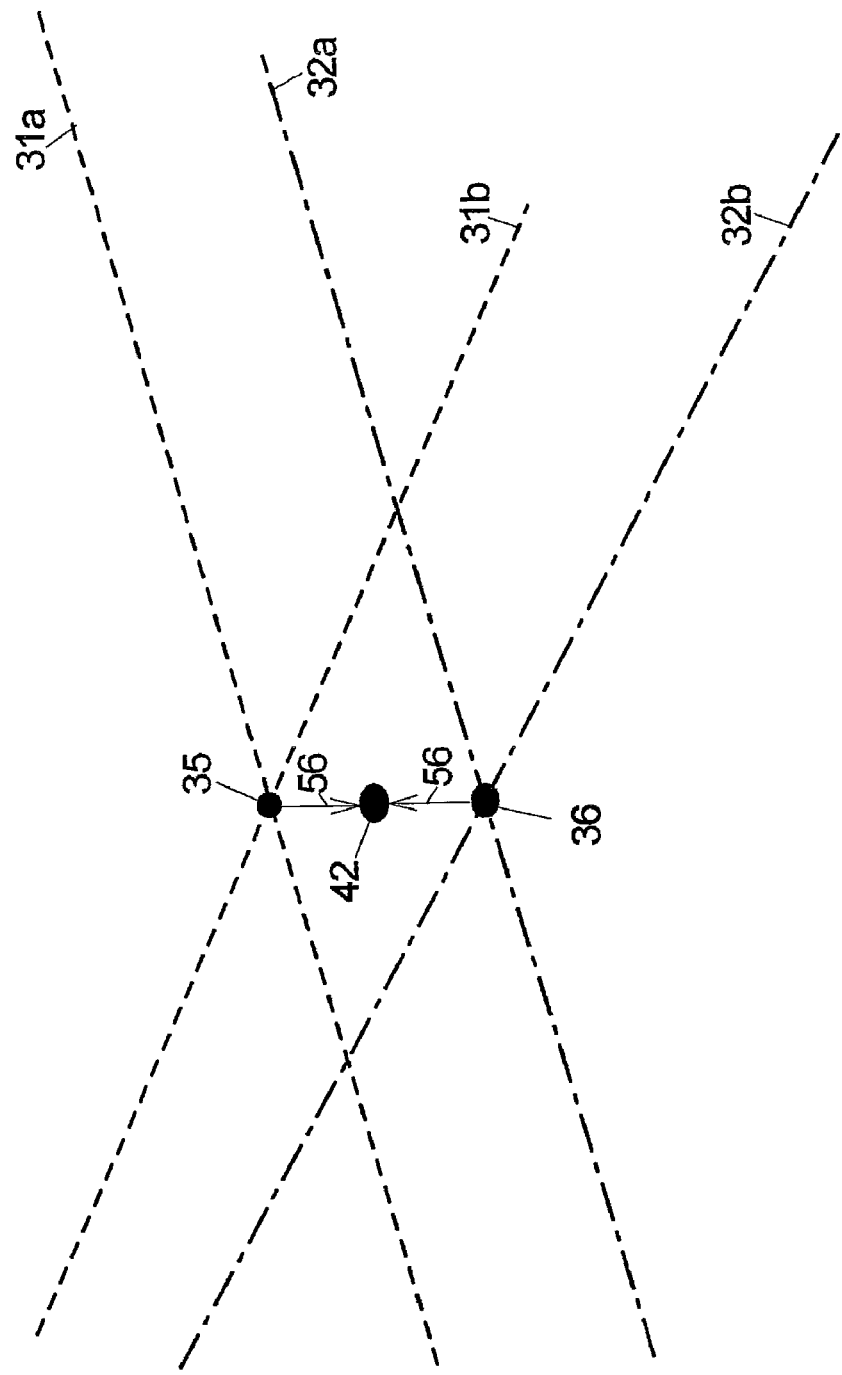
FIG. 4 shows a schematic for determining a correction transform in accordance with a second embodiment.

With the aid of the spacings of the intersection points 35, 36 of the calibration patterns 30 from the third intersection point 42, it can be recognized in FIG. 3 that the first projection apparatus 11 is set too far to the right and too far above, the second projection apparatus 12 is set too far to the right and too far below.

The aim is that the intersection points 35, 36 of the projected lines are drawn to the same target point that is determined by the camera-induced reference pattern 40. In accordance with FIG. 3, the target point is the third intersection point 42.

This aim is achieved as follows in the first embodiment, reference being made to FIG. 13.

Figure 13:
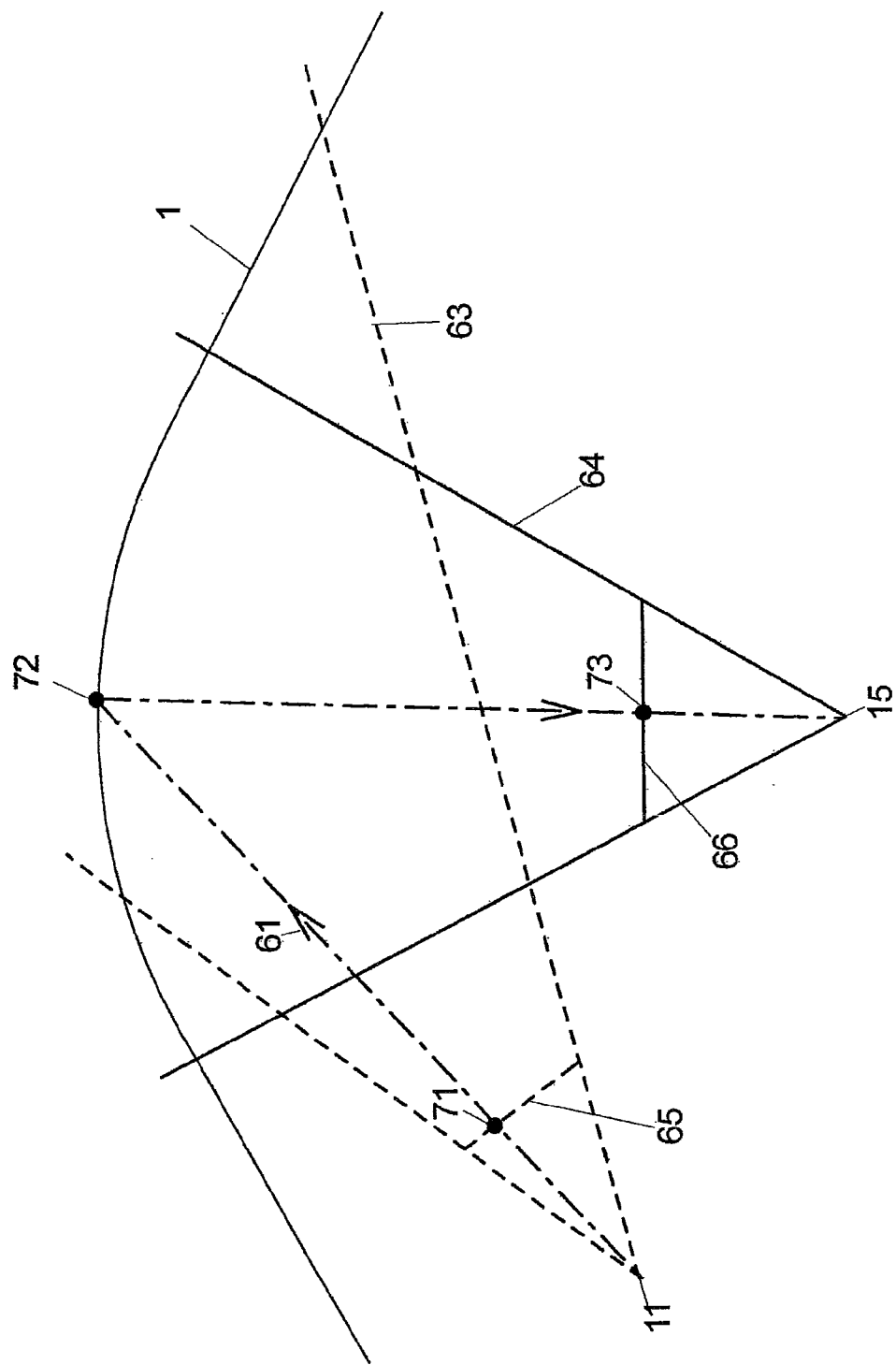
FIG. 13 shows a schematic of the real beam path in the first embodiment.

FIG. 13 illustrates a projection area 1 that is irradiated by the first projection apparatus 11. The camera apparatus 15 views, inter alia, a portion of the projection area 1 irradiated by the first projection apparatus 11. With its projected image, the first projection apparatus 11 defines a projection frustum (a type of projection "cone") 63 (dashed line). The image to be projected by the first projection apparatus 11 is located in the assigned projector image plane 65.

The camera apparatus 15 also defines a type of viewing cone 64 (continuous line). The image it photographs lies in the assigned camera image plane 66.

In the case of the first embodiment, the real configuration and beam path (the parameters of which are all known as accurately as possible) illustrated in FIG. 13 are reproduced in a virtual model. Consequently, the following describes which steps are carried out in the real configuration (see FIG. 13) and which steps are simulated in the virtual model (see FIG. 14).

The first projection apparatus 11 casts a calibration pattern 30 with a large set of interpolation points (that is to say intersection points between horizontal and vertical strips (for example 31a, 31b, 32a, 32b in FIG. 3)) onto the projection area 1 in the real case.

The beam path 61 (dashed and dotted lines) of such an interpolation point can be followed using FIG. 13. The interpolation point lies in the projector image plane 65 at the point 71. The interpolation point is located on the projection area 1 at the point 72. The camera apparatus 15 takes an image. This point is located at point 73 on the image (in the camera image plane 66).

Figure 14:
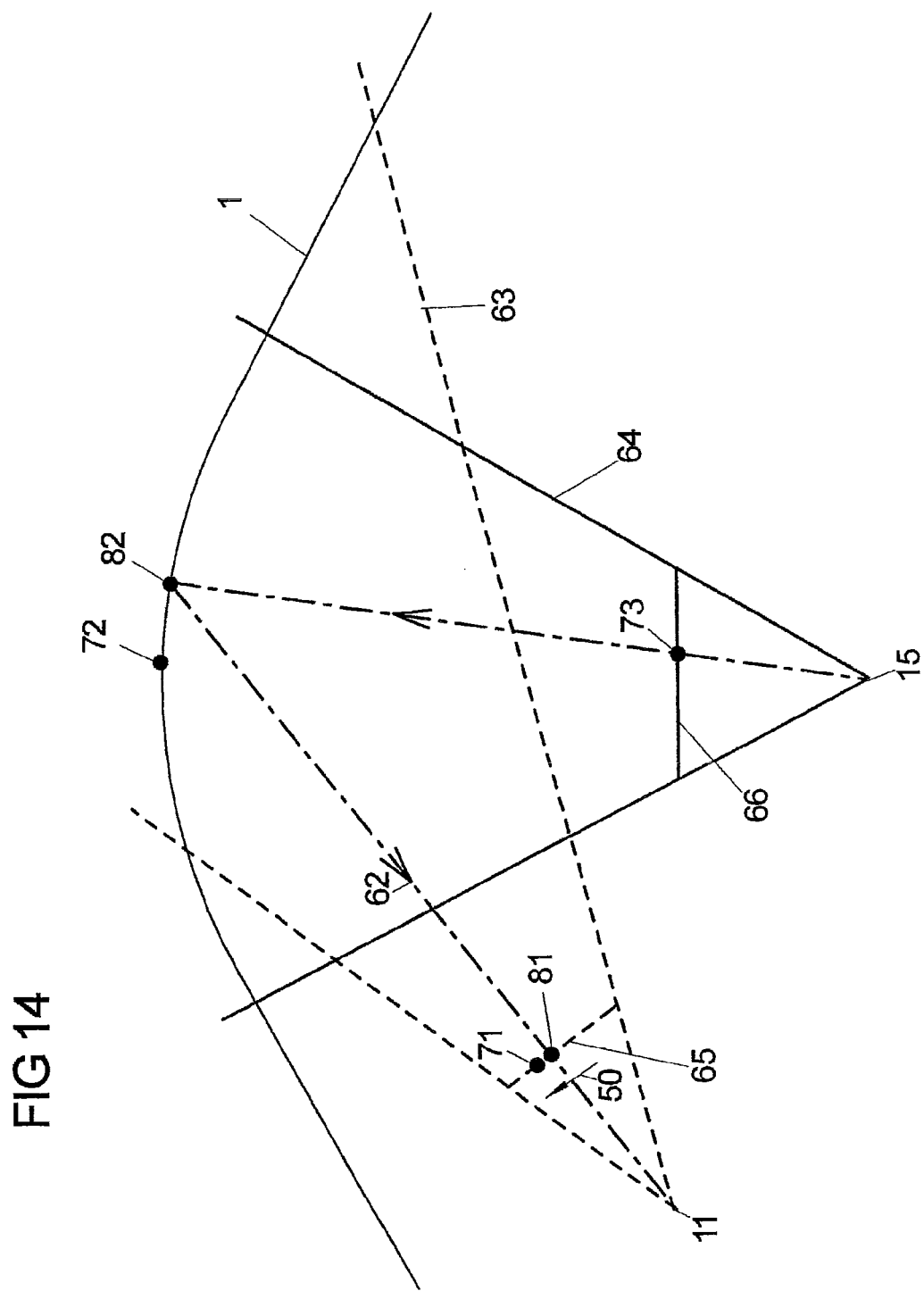
FIG. 14 shows a schematic of the virtual beam path in the first embodiment.

The virtual model of this configuration will now be examined in accordance with FIG. 14. If all were set up perfectly in the real case (which is impossible) the virtual model would be identical to the real configuration, that is to say the intersection points would lie exactly above one another.

Since the real configuration is, however, imperfect, there are slight differences between the real configuration and the virtual model.

In the virtual case, the camera now "shoots" back this point 73, that is to say the latter is determined computationally. This is the beam 62 (dashed and dotted line) in FIG. 14.

Were the real configuration perfect, this beam would strike the point 72 in the real case (that is to say in FIG. 13) on the projection area 1 and, finally, arrive again at the point 71 in the projector image plane 65.

Since, however, the configuration is imperfect, the point 82 on the virtual projection area 1 is struck instead of point 72, it being located at point 81 instead of point 71 in the projector image plane 65. This means that the camera apparatus 15 would actually have expected in its image plane 66 at the point 73 an interpolation point from the projector image plane point 81, and not from the projector image plane point 71.

The interpolation points (and thus finally, the image contents to be projected) are now displaced in the projector plane 65 such that the image really cast by the projection apparatus 11 occurs exactly where the camera apparatus 15 requires.

In the real case, the point 71 was projected, and it was determined that the point 71 arrives in the camera image plane 66 as point 73. However, (according to the perfect virtual model) the image point 81 from the projector image plane is to lie at the point 73.

The correction transform 50 now consists (for this interpolation point) in that the image content (the interpolation point) is transformed in the projector image plane 65 from point 81 to point 71. This is because it is known that for point 71 in the projector image space it is point 73 that is of importance in the camera image plane 66 in the real case. Thus, after application of the correction transform 50 at point 71, the image content which was actually situated at point 81 is projected and lands on the projection area 1 at point 72 and, finally, lands in the camera apparatus 15 at point 73—exactly where it ought to be.

A computational relationship is formed in the computing unit as correction transform 50 that displaces the interpolation points 35, 36 of the calibration image into the interpolation points of the reference image 37. The computational relationship can be in the form of a function, table or parameters. It is particularly advantageous when use is made of a so-called mesh that does not presuppose an analytical inscription of the transform. The mesh is a type of grating structure that acts on the projector image and consists of a specific number of interpolation points. The displacements described as necessary for individual points in the projector image are applied in this case to the associated interpolation points of the mesh, whereupon the projector image is distorted in the way desired.

A correction can be performed in the entire overlap region 2 by this transform. The correction transform 50 is implemented, for example, in the form of a table. For reasons of clarity, the correction transform 50 is illustrated in FIG. 3 only for a pair of interpolation points. However, it is possible in principle also to apply the correction transform 50 to any desired number of interpolation points.

This process is carried Out for many different interpolation points of the projector image plane. These interpolation points define a network that covers the entire projector image plane, for example a network composed of 100 times 100 uniformly distributed interpolation points. After displacement of all the interpolation points of this projection apparatus 11 to the corrected positions, the entire projector image is displaced exactly to the point where it ought to be for the camera apparatus.

It is now possible to add yet a second, third and, if appropriate, yet further projection apparatuses 11, 12, 13, respectively. Exactly as the image of the first projection apparatus 11, their projected images are drawn exactly to the points where these should lie on the basis of the information determined by the camera apparatus (according to the perfect virtual model). Since in the virtual model the image contents of two projectors lie exactly upon one another, they now also lie upon one another in the real case after the calibration.

Interpolation points of the projector image space that are not recognized in the photos are interpolated and extrapolated.

In the case of the second embodiment, the parameters of the camera apparatus 15 are not used, that is to say they also need not be known in advance. However, it is advantageous whenever the projection apparatuses 11, 12 are nevertheless well adjusted manually. The mode of procedure of the second embodiment is explained in FIG. 4, use being made here in principle of the same calibration patterns 30 as in the case of the first embodiment (FIG. 3). Reference may therefore be made to the corresponding description of the first embodiment. However, the calibration patterns of the second embodiment are predistorted, so that they are adapted to the shape of the projection area 1 (for example a spherical coordinate system for a spherical projection area).

In the second embodiment, the parameters of the camera apparatus 15 are unknown, that is to say there is no camera apparatus here that can give a reference for the projection apparatus 11, 12.

Instead, the projection apparatuses 11, 12 must be preadjusted as well as possible by hand. The last remaining differences are to be reduced or corrected by means of the second embodiment of the inventive method in that, when the image contents of two projection apparatuses 11, 12 "do not lie upon one another" it forms a kind of compromise in the overlap region 2, and the overlapping projector image contents are contiguous. This is illustrated by way of example in FIG. 4, in which, by analogy with FIG. 3, only selected parts of a calibration pattern are illustrated.

In this case, a first projection apparatus 11 (not illustrated here) casts a first calibration pattern 31 (dashed lines) with horizontal strips 31a and vertical strips 31b. Here, only one strip 31a, 31b is respectively illustrated. A first intersection point 35 results.

A second projection apparatus 12 (likewise not illustrated here) casts a second calibration pattern 32 (dashed and dotted lines) with horizontal strips 32a and vertical strips 32b. Here, as well, only one strip 32a, 32b is respectively illustrated. A second intersection point 36 results.

The first intersection point 35 of the first projection apparatus 11, and the second intersection point 36 of the second projection apparatus 12 should actually lie upon one another. A target point 42 is now defined as compromise, specifically as the mean value between these two intersection points 35, 36.

So that the interpolation points in the projector image space also actually achieve these mean values, the point displacements in the projector image space must be inferred from the point displacements in the camera image space. This is possible via the neighboring interpolation points of the respective interpolation point in the projector image space for which, after all, the associated points in the camera image space are also available.

The first intersection point 35 and the second intersection point 36 are to be displaced onto the target point 42.

Figure 15:
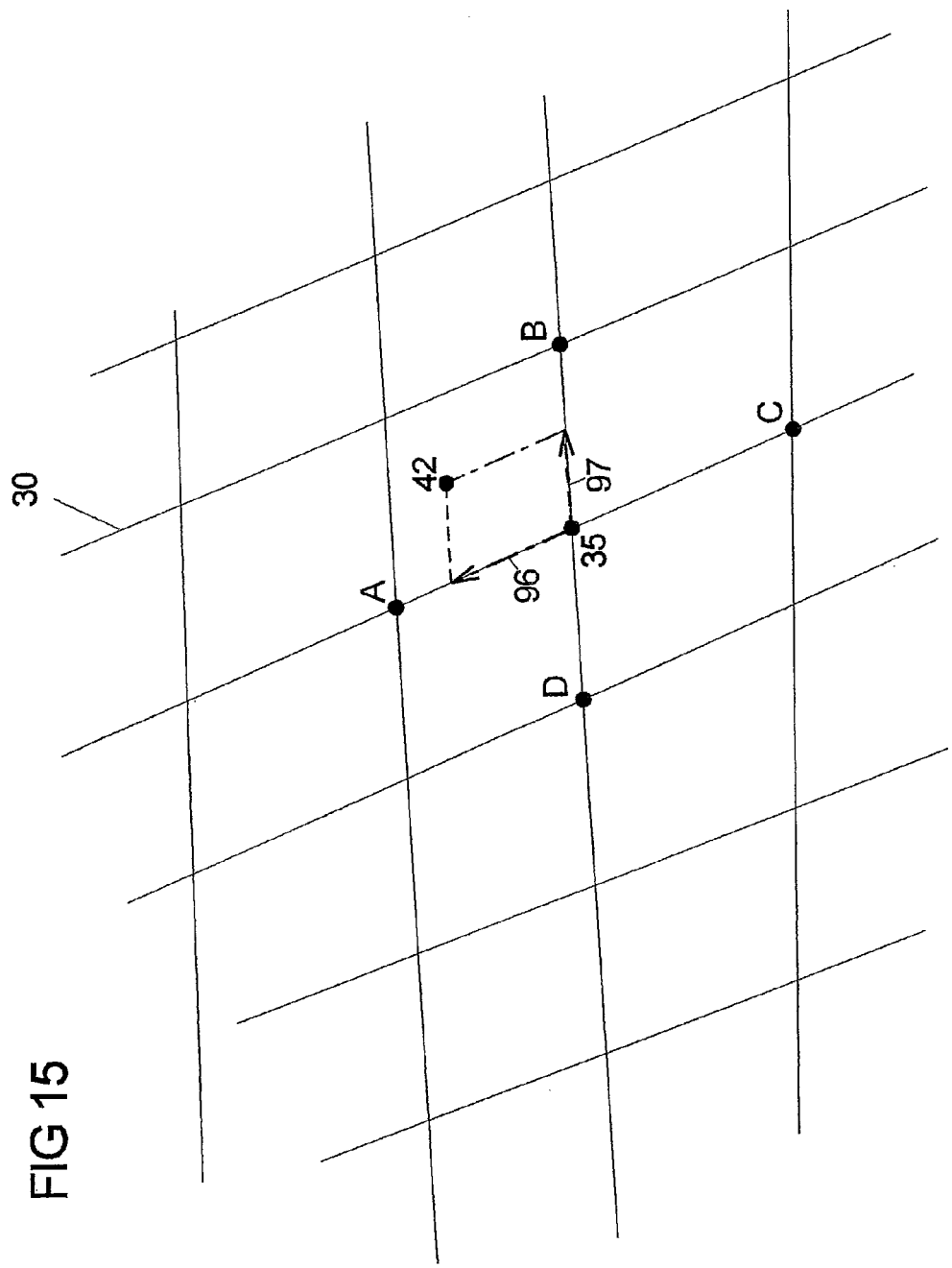
FIG. 15 shows a schematic of the images of a point in the camera image space.
Figure 16:
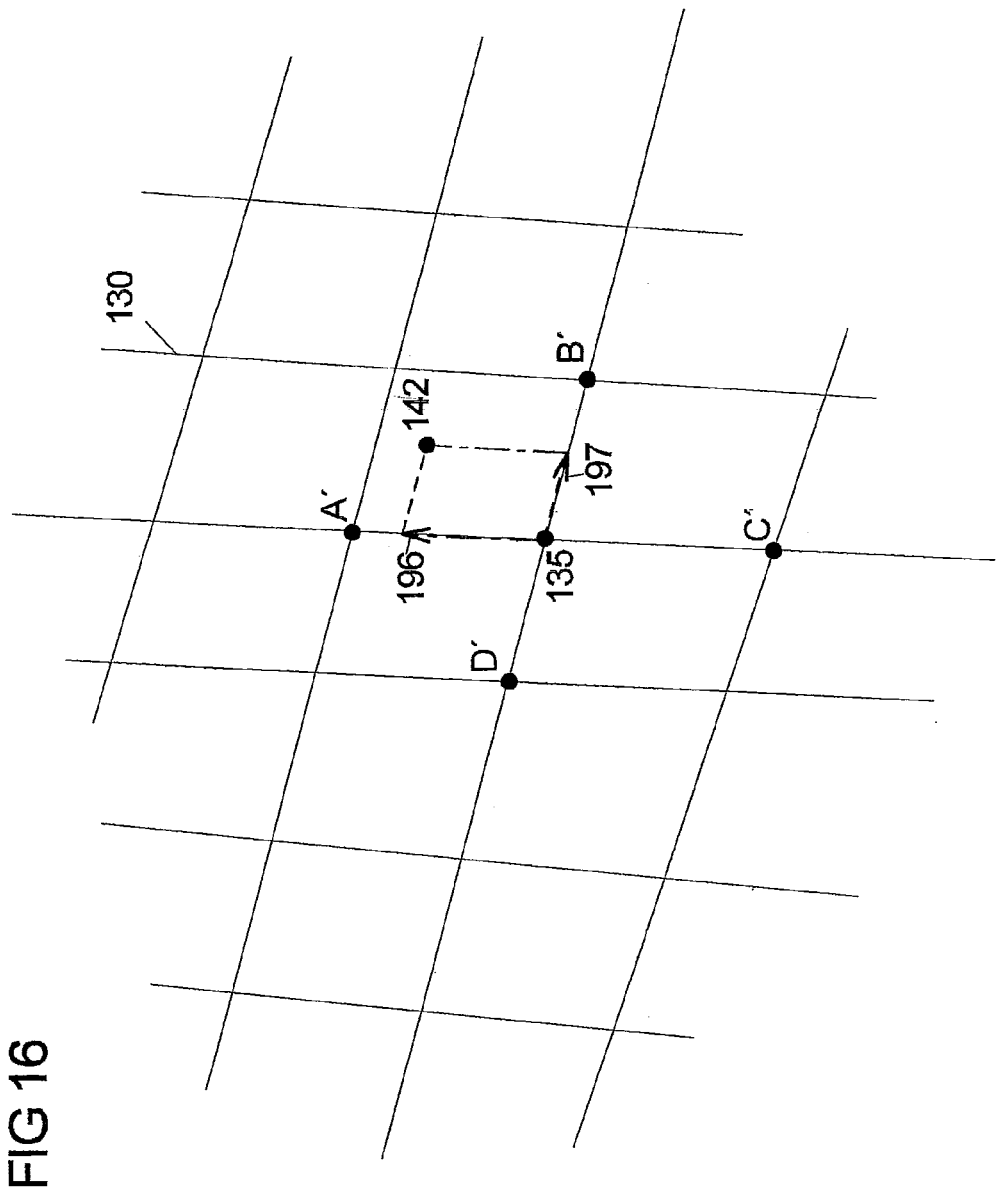
FIG. 16 shows a schematic of the image of a point in the projector image space.

All these points are located in the camera image plane (see FIG. 15 for an illustration of the camera image space). The associated projector image space is illustrated in FIG. 16.

The original point 135 in the projector image plane of the first projection apparatus 11 (see also FIG. 16) is known for the first intersection point 35 of the camera image plane (see FIG. 15).

The original point in the projector image plane of the second projection apparatus 12 is also known for the second intersection point 36 of the camera image plane.

The original point in the projector image space (point 142 for the first projection apparatus 11), which belongs to the target point 42 and lies in the camera image space, is initially unknown.

What is required is to determine this for each projection apparatus 11, 12 and for each interpolation point. The calculation for the first projection apparatus 11 is examined below. The calculation for the second projection apparatus 12 is performed analogously.

FIG. 15 shows the camera image space. A calibration pattern 30 in the first projection apparatus 11 is illustrated that has horizontal and vertical strips 31, the first interpolation point 35 and the target point 42 for the first interpolation point 35. Furthermore, the neighboring points A, B, C, D of the first interpolation point 35 are depicted.

FIG. 16 shows the same image as in FIG. 15, but in the projector image space of the first projection apparatus 11. The horizontal and vertical strips are shown, together with the interpolation point 135 and the target point 142 for the interpolation point 135. The neighboring points A', B', C', D' of the interpolation point 135 are further depicted.

Since the projector image is generally cast obliquely onto curved projection area 1, and is recorded from an unknown angle, there is generally a clear difference between the image in the camera image space (after projection, FIG. 15) and the same image (before projection, FIG. 16): It is rotated, displaced, curved, distorted, etc.

It is now required to determine the position of 142 (in the projector image space). This must be done so that after the projection at this point the (target) point 42 in the camera image space is struck. This is because when the correction transform in the projector image space displaces the interpolation point 135 exactly onto the point 142 this interpolation point thus subsequently comes to lie on 42 in the camera image space. This is exactly the goal.

The determination of the pixel coordinates of point 142 is described below.

The positions of the interpolation points in the projector image space 135, A', B', C', D' are known since these are fixed in the calibration patterns 30 themselves.

Intersection points 35, A, B, C, D in the camera image space are also known, since these interpolation points have been recognized again in the photo (for example using the color-coded light section technique). The target point 42 in the camera image space is known, since it has been calculated as the mean value of the points of a number of projectors. This calculated target point 42 serves as reference value. If the calculation is carried out for many intersection points, a reference pattern is obtained.

The target point 142 in the projector image space will now be calculated with the aid of the neighboring interpolation points.

It is illustrated in the example of FIG. 15 that it is possible to reach the point 42 starting from point 35 if 70% of the path goes in the direction of the point A (which is the arrow 96), and then 50% of the path goes from point 35 to point B (that is the arrow 97, or the dashed, parallel-displaced copy of the arrow 97).

This calculation of the target point 42 from the interpolation point 35 and its two neighbors A, B is transformed in the camera image space into the projector image space, in order to be able to calculate the target point 142.

Again, one proceeds from the interpolation point 135, then goes (to the same extent as in the camera image space) a little in the direction of point A' (specifically 70% of the path in this example, arrow 196), and then covers (to the same extent as in the camera image space) a part of the path from point 135 to point B' (specifically 50% of the path in this example, arrow 197). The coordinates of the target point 142 are thus arrived at. It is then thereby possible for the interpolation point 135 to be displaced into the target point 142, whereupon—as desired—the image content that had been located at the interpolation point 135 in the projector image will now appear in the camera image space at point 42 and no longer at point 35.

The correction transform 50 is composed here of the displacements symbolized by the arrows.

As in the case of variant A, this calculation is executed for a grating network composed of interpolation points that covers the projector image. Subsequently, the entire image of this projector lies in the camera image space together with its interpolation points at the "compromise" interpolation point positions. Since this calibration is carried out for each projector, the projectors subsequently lie upon one another in the overlap region.

However, the "mean value" must advantageously be weighted so that no discontinuity/kinks in the projector images result. By way of example, a sensible weighting would be: high weight in the vicinity of the middle of the projector image, and low weight in the vicinity of the projector edge.

Figure 9:
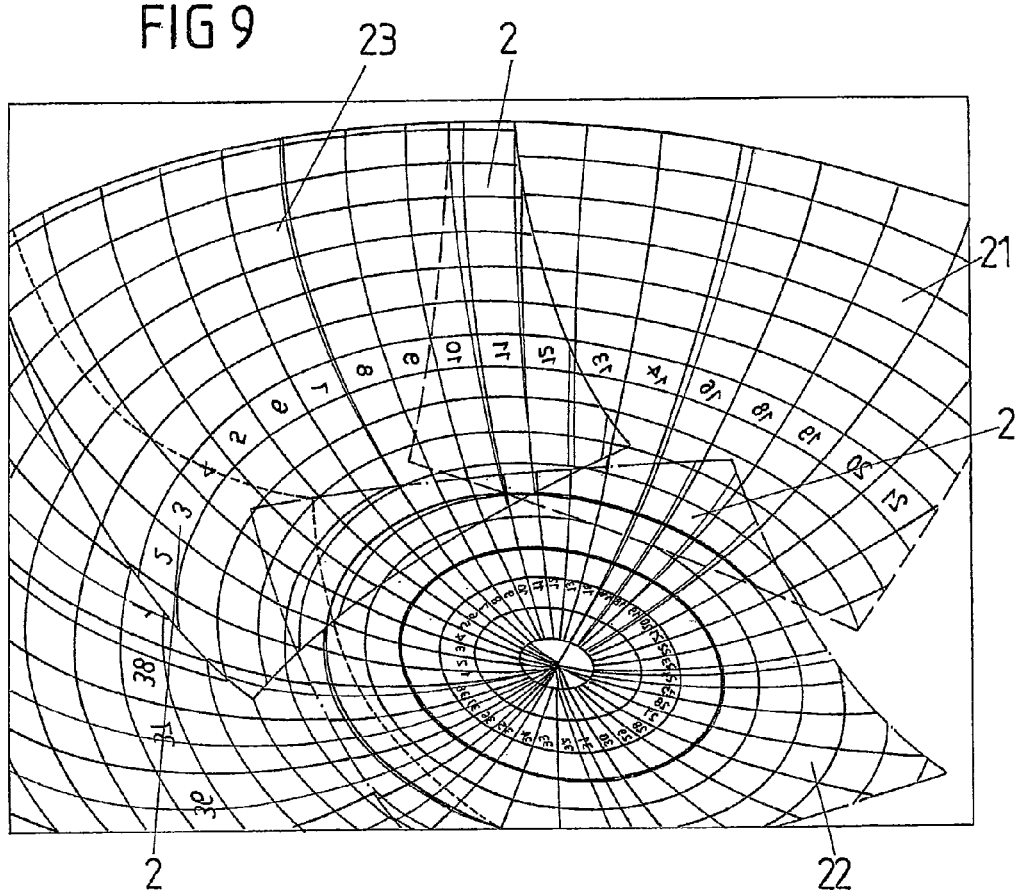
FIG. 9 shows a recording of a projection into a spherical shell before the execution of the calibration method.
Figure 10:
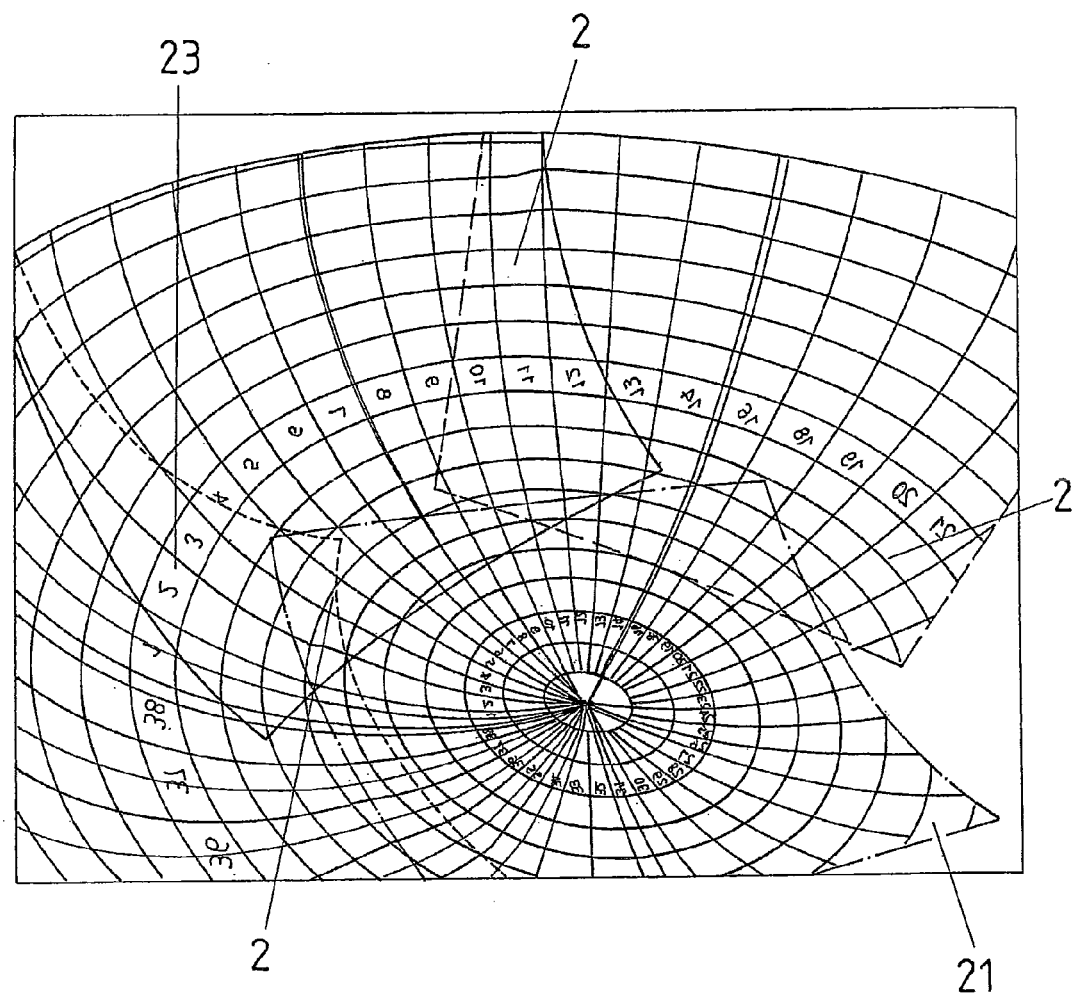
FIG. 10 shows a recording of the projection according to FIG. 9 after the execution of the calibration method.

The second embodiment is also described in conjunction with FIGS. 9 and 10. In this case, the projection area 1 is a spherical shell into which a number of partial images 21, 22, 23 are projected from above by means of a number of projection apparatuses (not illustrated here). It may be seen from the double lines in FIG. 9 that matching is not good here in the overlap regions 2. After the method has been carried out in accordance with the second embodiment, the result in accordance with FIG. 10 is achieved. The partial images 21, 22, 23 now lie substantially correctly upon one another.

In the case of the third embodiment, neither are the parameters of the camera apparatus 15 known, nor are the projection apparatuses 11, 12 preadjusted.

Figure 11:
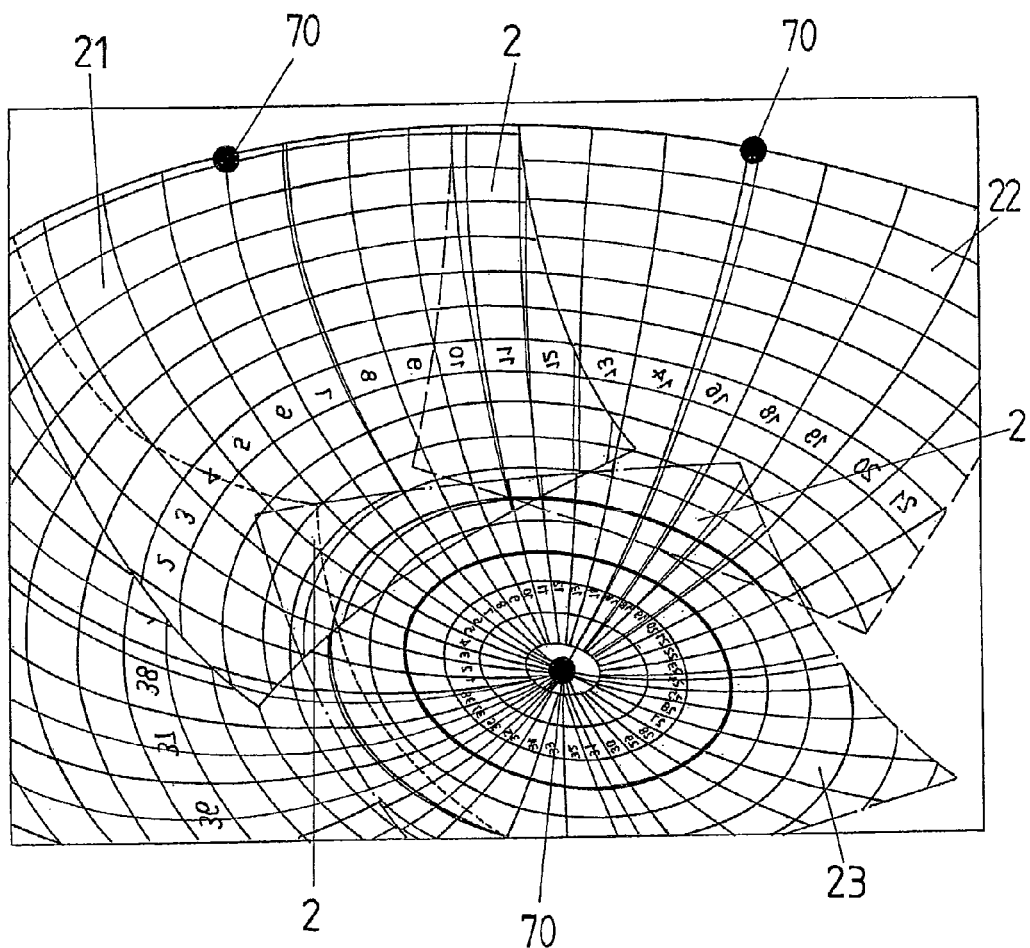
FIG. 11 shows a recording of a projection into a spherical shell with the use of markers, for use in an embodiment of the inventive calibration method.

A virtual 3D model of the projection area 1 (for example a dome as in FIG. 5) is known; it is stored in the computing unit 20. A concrete exemplary embodiment is illustrated in FIG. 11, the projection area 1 being a spherical shell into which a number of partial images 21, 22, 23 are projected.

A number of markers 70 (LEDs, laser pointers) are provided at well-defined points on the projection area 1; two at the edge, one at the zenith.

Since the camera apparatus 15 cannot record the entire dome 1 with the markers from one view, the calibration is carried out in segments. Let us assume that the dome projection comprises six projection apparatuses 11, 12 (five for the panorama and one for the zenith). The markers 70 would in this case be arranged at the zenith and every 72° at the edge, for example. When the camera apparatus 15 is recorded, it must be ensured that two edge markers 70 and the zenith marker 70 are respectively in the image of the camera so that an assignment is possible. In the case of the dome, the markers 70 define a spherical triangle.

It is thus possible to map a 72° segment of the 3D model of the dome into the photos of the true dome via geometric transformation (perspective transformation, rotation, translation, shearing, lens distortion, . . . ). Reference lines are contained in this virtual segment (for example every 5°).

Subsequently, there are projected for each projection apparatus 11, 12 of the currently viewed segment calibration patterns 30 that are compared with these reference lines so that the pixel displacement can be determined for each component projector 11, 12. A subsegment is calibrated if all the component projectors are matched by image warping to these reference patterns. This calibration is performed analogously for the remaining subsegments. Since these subsegments are based on the same 3D reference model, the segments calibrated independently of one another match one another.

It is to be recommended for the cross-fade region on the projectors to be approximately in the middle of a subsegment so that the segments do not abut one another in the cross-fade region, since this would complicate blending between the projectors. The distortion and the brightness correction (blending) is performed by analogy with the method for multiprojector calibration described in DE 102 51 217.

The commonalities of all three embodiments are described below once again.

1. Setup: In each embodiment, at least some of the information relating to the setting up of the hardware is input: size and shape of the projection area 1, position and alignment of the camera apparatus 15 and/or position and alignment of the projection apparatuses 11, 12.
2. Calibration patterns: The projection apparatuses 11, 12 cast calibration patterns 30 onto the projection area 1.
3. Recording of calibration image: The camera apparatus 15 photographs these calibration patterns 30 and generates a calibration image for further computational processing. By way of example, the camera apparatus can have a movable camera that is repositioned, or a number of fixed cameras. It is also possible to use a panoramic camera or fish-eye camera. If appropriate, a black and white image is recorded in order to remove interference light.
4. Matching with a reference pattern: The information extracted from the recordings of the calibration images are matched with a reference pattern 40, a type of "model" for the desired image, which is as perfect as possible.
5. Generation of correction transform: A distortion rule, a correction transform 50, is calculated from the matching with the reference pattern 40. This distortion rule is applied to the projector image, whereupon the entire image is corrected and the observed errors disappear. The transforms required in this case need not be describable with the aid of normal mathematical functions. The "mesh" described above is advantageously used for the distortion.

The respective differences between the three exemplary embodiments are explained below in relation to the general procedure, reference being made to the five above-named categories.

First Embodiment
1. Setup
   Geometry of the display area must be known
   Geometry of the projectors must be known
   Geometry of the camera must be known
2. Calibration Patterns
   "Normal", undistorted patterns are projected by the projectors
4. Matching reference patterns: The entire setup (projection area 1, projection apparatuses 11, 12, camera apparatuses 15) is remodeled in the virtual case in the computing unit 15 of the system. The projection apparatuses cast defined calibration patterns 30, and the cameras take photos. The computing unit recognizes the calibration patterns 30 of the projector images in the recordings again, and thereby has a multiplicity of interpolation points in the projector image space with unique assignment in the camera image space.

Second Embodiment
1. Setup:
   geometry of the display area must be known
   geometry of the projectors must be known. The projectors should already be adjusted manually as well as possible
   geometry of the camera need not be known
2. Calibration patterns: predistorted patterns are projected with the aid of the projection apparatuses 11, 12. That is to say they are already adapted to the geometry of the projection area 1. This is necessary so as to have interpolation points that are to lie at exactly the same point on the display area in two overlapping projector images in each case. This does not apply for undistorted patterns that are arranged symmetrically in the projector image space (for example horizontal/vertical strips with fixed spacing from one another).

4. Matching with reference pattern: Points/lines whose projection of the individual projectors should lie upon one another are projected in the overlap region for specific interpolation points.

Third Embodiment

1. Setup geometry of the display area must be known n markers are provided on the projection area at well-defined spacings (LEDs, laser pointers and the like)

parameters of the projectors need NOT be known.

parameters of the camera need NOT be known

2. Calibration patterns: "normal", undistorted calibration patterns 30 are projected with the projection apparatuses 11, 12. Since it can be that the calibration patterns 30 cannot be fully acquired by the camera apparatus 15, the color-coded light section technique and/or the projection of middle strips can be used as reference.

3. Recording of calibration image: recording of a marker image for later assignment of the uv coordinates.

4. Matching with reference pattern: The previously known 3D model of the projection area 1 is mapped into the recordings of the calibration patterns with the aid of the previously recognized markers as reference pattern. This is done with the aid of known methods of computer graphics (perspective transformation, translation, rotation, shearing, lens distortion, . . . ). The uv coordinates of specific points or lines in this 3D model are known (the accuracy can be fixed by the user), and are used for matching between reference and projection. The filtered, projected calibration patterns 30 are now compared with these reference coordinates. For each point of the calibration pattern (for example in the raster 20×20 pixels), an associated uv coordinate is determined via the known reference coordinates (image warping, see DE 102 51 217 A1). These uv coordinates with associated positions in the frame buffer are required for the real-time distortion of the projection, and are stored for further real-time processing. The blending between individual projectors can be calculated from mutually overlapping calibration patterns. These data are likewise stored for later real-time distortion. Particularly in the case of a dome, the calibration is carried out per segment (for example 72°/90°). Since each segment is based on the same 3D reference model, the result is a self-consistent global calibration that is composed of a number of locally calibrated segments.

Figure 12:
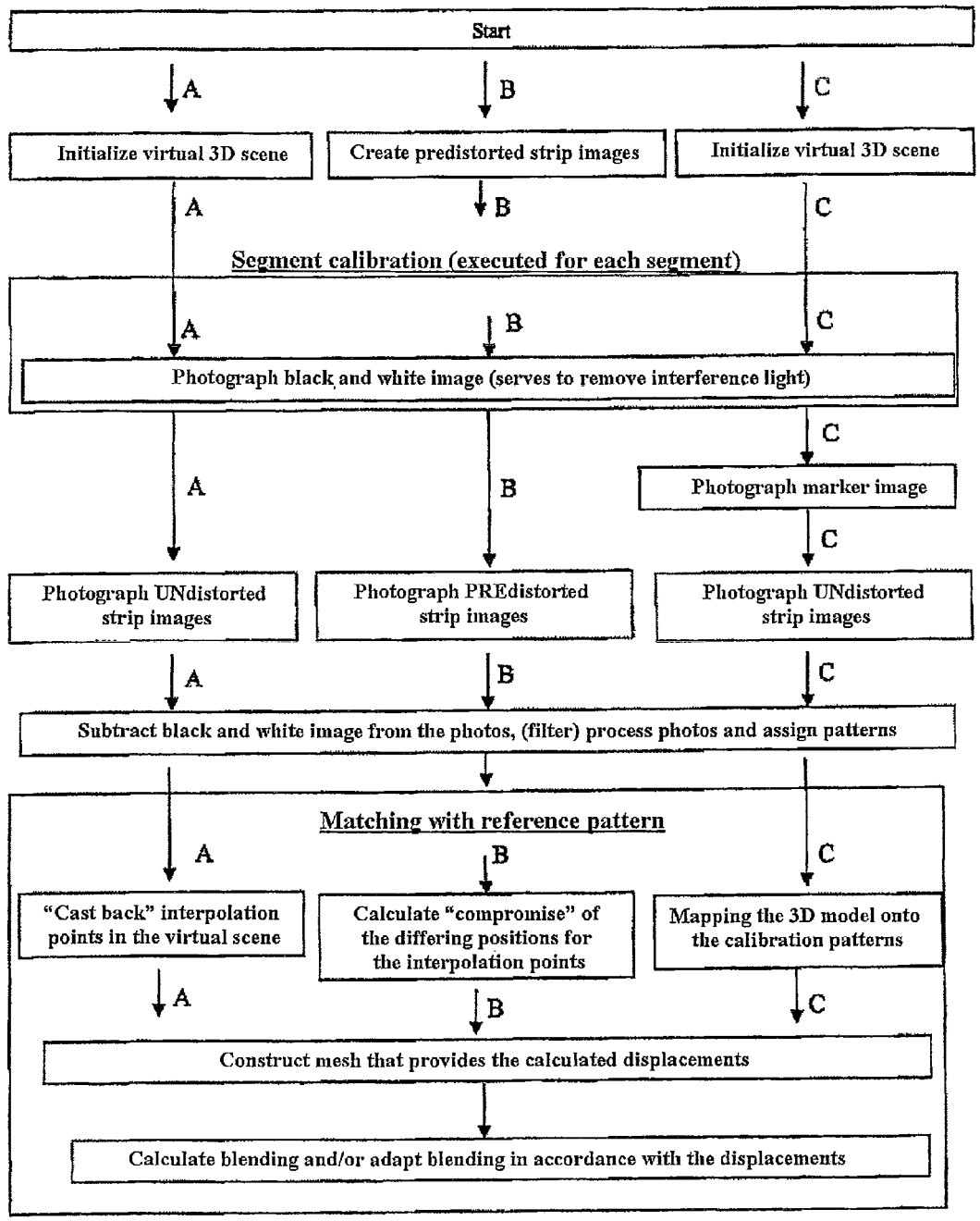
FIG. 12 shows a flowchart for comparing three embodiments.

The differences between and commonalities of the three embodiments are illustrated in FIG. 12, the first embodiment being denoted by A, the second by B and the third by C.

It may be remarked that the three embodiments can be intercombined, that is to say, another embodiment is used respectively for different points in an overlap region or for different overlap regions. It is thereby possible to intercombine the strengths of the individual methods.

The embodiment of the invention is not restricted to the preferred exemplary embodiments specified above. Rather, it is possible to conceive a number of variants that make use of the inventive calibration method and calibration system even with designs of basically different type.

List of Reference Symbols

1 Projection area
2 Overlap region
11 First projection apparatus
12 Second projection apparatus
13 Third projection apparatus
15 Camera apparatus
20 Computer unit
21 First partial image
22 Second partial image
23 Third partial image
30 Calibration pattern
31, 31a, 31b First calibration pattern
32, 32a, 32b Second calibration pattern
35 First intersection point
36 Second intersection point
40 Reference pattern
41a, 41b Reference lines
42 Third intersection point (FIG. 3), Target point (FIG. 4)
50 Correction transform
62 Beam in the virtual model
63 Projection cone
64 Viewing cone
65 Projector image plane
66 Camera image plane
70 Marker
71, 72, 73 Points in the real beam path (FIG. 13)
81, 82 Points in the virtual beam path (FIG. 14)
96, 97 Displacements in the camera image space (FIG. 15)
135 Intersection point in the projector image space (FIG. 16)
142 Target point in the projector image space (FIG. 16)
196, 197 Displacements in the projector image space (FIG. 16)
A, B, C, D Neighboring points in the camera image space (FIG. 15)
A', B', C', D' Neighboring points in the projector image space (FIG. 16)

The invention claimed is:

1. A calibration method for at least one projection apparatus for projecting images onto at least one projection area, wherein the at least one projection area is associated with geometric data having been or being stored in advance in a computer unit, comprising:

a) projecting, with the at least one projection apparatus, previously known calibration patterns onto at least a portion of the at least one projection area, b) recording the previously known calibration patterns by at least one camera apparatus as a calibration image, wherein data of the calibration image is transmitted to the computer unit, c) automatically determining, by means of the computer unit, a deviation between the recorded calibration image and an ideal imaging result of the previously known calibration patterns on the at least one projection area, the ideal imaging result forming a reference pattern, wherein an actual arrangement of the at least one projection area, of the at least one projection apparatus, and of the camera apparatus is modeled in a virtual three-dimensional model according to known geometric data of the at least one projection area, of the at least one projection apparatus, and of the camera apparatus, and d) determining, by means of the computer unit, a correction transform from the deviation between the recorded calibration image and the reference pattern such that a transformation of a real projection of images by means of the correction transform by the at least one projection apparatus corresponds, particularly in an overlap region, with the reference pattern apart from a minimum deviation, wherein the correction transform causes a displacement of at least one point of the recorded calibration image onto a point of the reference pattern.

2. The calibration method as claimed in claim 1, further comprising: aligning overlapping projections of at least two projection apparatuses by minimizing the deviation from the reference pattern so that no discontinuities are visible in the overlap region.

3. The calibration method as claimed in claim 1, wherein the at least one projection area consists at least partially of at least one of the group of a spherical shell, a cylindrical shell and a planar surface.

4. The calibration method as claimed in claim 1, wherein the at least one camera apparatus comprises at least one of the group of at least one digital camera, at least one video camera, at least one fish-eye camera and at least one webcam.

5. The calibration method as claimed in claim 1, wherein the at least one camera apparatus is mounted rotatably on at least one axis in order to record an image of the at least one projection area.

6. The calibration method as claimed in claim 1, wherein the at least one projection apparatus comprises at least one of the group of a beamer, laser projector, LCD projector and DLP projector.

7. The calibration method as claimed in claim 1, wherein at least one calibration pattern is a strip pattern in which individual strips are arranged parallel to one another.

8. The calibration method as claimed in claim 1, wherein at least one calibration pattern comprises at least one of the group of curved, predistorted, single-color, multicolor and color-coded strips.

9. The calibration method as claimed in claim 1, wherein at least one calibration pattern has a point pattern.

10. The calibration method as claimed in claim 1, further comprising: recording, by means of the at least one camera apparatus, a black and white image before evaluating a recording of at least one calibration pattern.

11. The calibration method as claimed in claim 1, further comprising: blending in the overlap region in order to adapt brightness values.

12. The calibration method as claimed in claim 1, further comprising: automatically varying at least one spatial orientation of the at least one projection apparatus as a function of the correction transform.

13. The calibration method as claimed in claim 1, further comprising: automatically determining parameters of the at least one camera apparatus by making a recording of a previously known pattern, in particular a marker pattern on the at least one projection area, and by calculating the parameters of the at least one camera apparatus therefrom with the aid of the computer unit.

14. A calibration system comprising:
a) at least one projection apparatus for projecting images onto at least one projection area, the geometric data of the at least one projection area having been or being stored in advance in a computer unit, with at least one projection apparatus projecting previously known calibration patterns onto at least a portion of the at least one projection area;
b) at least one camera apparatus for recording the previously known calibration patterns as a calibration image, it being possible to transmit data of the calibration image to the computer unit; and
c) with the computer unit, automatically determining a deviation between the recorded calibration image and an ideal imaging result of the previously known calibration patterns on the at least one projection area, the ideal imaging result forming a reference pattern, wherein an actual arrangement of the at least one projection area, of the at least one projection apparatus, and of the camera apparatus is modeled in a virtual three-dimensional model according to known geometric data of the at least one projection area, of the at least one projection apparatus, and of the camera apparatus; and
d) a correction means for determining a correction transform from the deviation between the recorded calibration image and the reference pattern such that a transformation of a real projection of images by means of the correction transform by the at least one projection apparatus corresponds, particularly in an overlap region, with the reference pattern apart from a minimum deviation, wherein the correction transform causes a displacement of at least one point of the recorded calibration image onto a point of the reference pattern.

* * * * *